No. 888,025. PATENTED MAY 19, 1908.
A. J. MARTIN.
COMBINED POLE AND SHAFT FOR VEHICLES.
APPLICATION FILED DEC. 23, 1907.
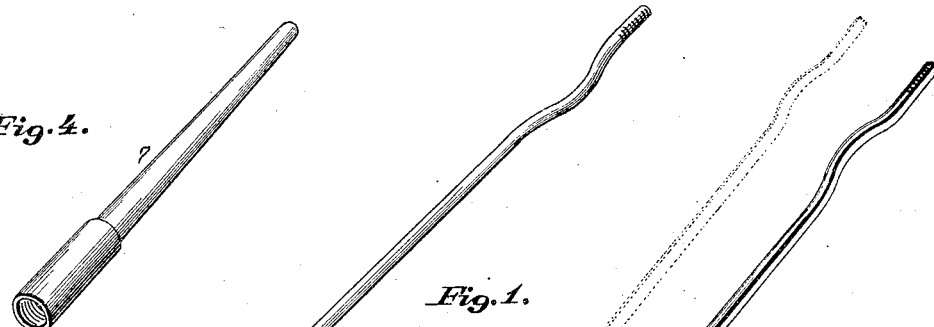
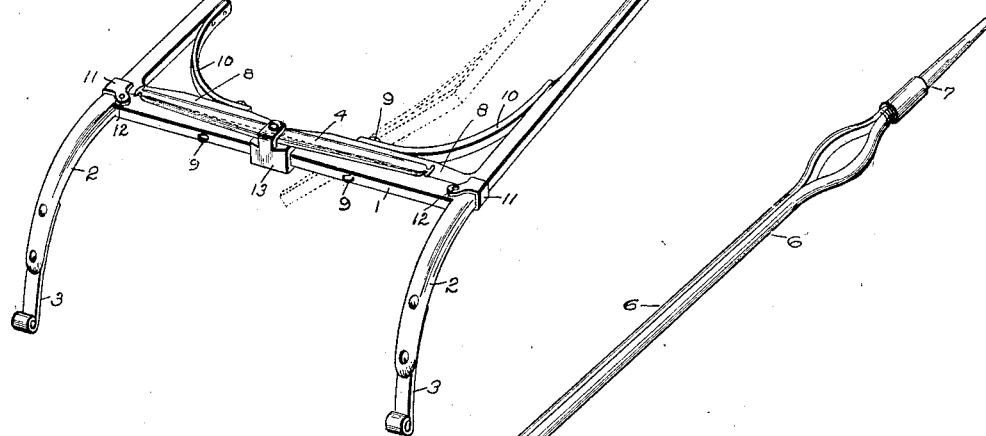
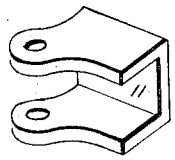
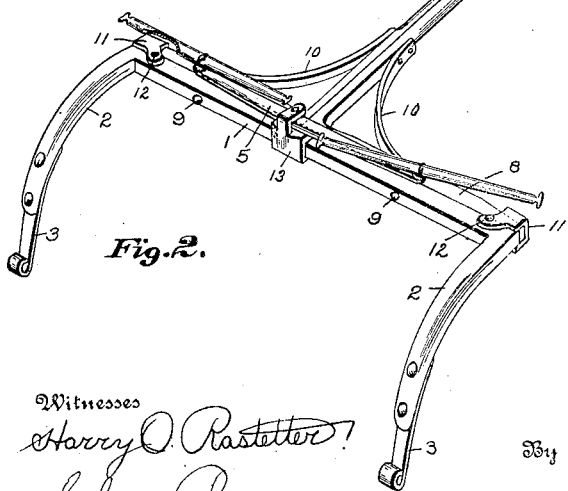
Inventor
Aaron J. Martin
Attorney

UNITED STATES PATENT OFFICE.

AARON J. MARTIN, OF TOLEDO, OHIO, ASSIGNOR OF ONE-HALF TO CHARLES C. MILLER, OF TOLEDO, OHIO.

COMBINED POLE AND SHAFT FOR VEHICLES.

No. 888,025.  Specification of Letters Patent.  Patented May 19, 1908.

Application filed December 23, 1907. Serial No. 407,756.

*To all whom it may concern:*

Be it known that I, AARON J. MARTIN, a citizen of the United States, residing at Toledo, in the county of Lucas and State of Ohio, have invented certain new and useful Improvements in Combined Pole and Shafts for Vehicles, of which the following is a specification.

This invention pertains to an improved shaft attachment for vehicles, whereby the same device may be adjusted and arranged for use with a double or single team as may be desired, and the improvement consists in providing means for rigidly holding the parts after they have been adjusted for use, either as a pole or shafts.

In the accompanying drawing: Figure 1 is a view showing the device adjusted for use as shafts. Fig. 2 is a view showing the device adjusted for use as a pole. Fig. 3 is a detached view of one of the holding clips. Fig. 4 is a detached view of the thimble.

Similar numerals of reference indicate corresponding parts in all the figures of the drawing.

In the accompanying drawing, 1 represents the cross-bar to which are attached the rearward curved arms 2, to which are attached the thill arms 3, these parts, however are of ordinary construction, and do not within themselves form any particular part of the present invention.

On the cross-bar 1 is pivoted the whiffletree 4 or the double-tree 5, reference being had to the use of the device, or in other words, whether the device is to be used as a pole or as shafts. The pole members 6 are divided longitudinally and when the device is to be used as a pole these members are brought into the position illustrated in Fig. 2, and when so used the thimble 7 is attached to the outer ends of the pole members 6 by means of suitable screw threads formed upon the pole members and the inner periphery of the thimble 7. It will be understood that by forming screw threads upon the ends of the pole members 6 and screw threading the inner periphery of the thimble 7, there can be no relative or slipping movement as between the pole members 6.

To the rear ends of the pole members 6 are attached the lateral bars 8, which lateral bars are formed of a length equal to substantially one-half of the length of the cross-bar 1, so that when the device is used as shown in Fig. 1 or used as shown in Fig. 2 the outer ends of the bars will be substantially even with the ends of the cross-bar 1.

When the device is used as shown in Fig. 1 the bars 8 will meet or practically meet at their inner ends and the divided pole members 6, which constitute the shafts when brought into the position in Fig. 1, will be in proper alinement with the arms 2 and the thill irons 3. It will be understood that the lateral bars 8 should be pivoted to the cross bar 1 about midway between their ends and the pole members 6, said lateral bars being pivotally connected to the cross-bolts 9. The pole members 6 are properly braced as between said pole members and the cross-bars 8 by means of the braces 10, which braces are connected in the usual manner and serve to brace the pole members 6 whether they are used as a pole or shafts. It will be understood that there should be no loose movement of the cross-bars 8 at any time. When it is desired to shift the device from the position shown in Fig. 1 to the position shown in Fig. 2 and in order to provide for sufficient rigidity the clips 11 are provided, which clips are connected to the cross-bar 1 by means of suitable clamping bolts 12 or their equivalents.

When it is desired to change from pole to shafts the clips 11 are removed, thereby freeing the lateral bars 8 at which time they can be turned upon their pivotal points and brought into the desired adjustment, and when brought into the desired adjustment the clips 11 are properly secured to the cross-bar 1 and when so secured they prevent any loose or relative movement as between the lateral arms 8 and the cross bar 1.

It will be understood that a clip such as 13 is to be connected to the cross bar 1, which clip may be of any desired and well known construction.

Having fully described my invention what I claim as new and desire to secure by Letters Patent, is—

The combination of a cross-bar provided with rearward extending arms, and thill irons connected thereto, arms pivotally attached to said cross bar intermediate their ends, pole sections secured to said arms, clips pivotally connected to the cross-bar and adapted to engage the opposite ends of the pivoted arms, substantially as and for the purpose specified.

In testimony that I claim the above, I have hereunto subscribed my name in the presence of two witnesses.

AARON J. MARTIN.

Witnesses:
O. P. WILKINSON,
F. W. WILKINSON.